(12) United States Patent
Versteyhe et al.

(10) Patent No.: US 8,353,804 B2
(45) Date of Patent: Jan. 15, 2013

(54) HYBRID TRANSMISSION AND METHOD OF USE

(75) Inventors: Mark R. J. Versteyhe, Oostkamp (BE); Veerle M. J. Van Doorsselaere, Ghent (BE)

(73) Assignee: Spicer Off-Highway Belguim N.V., Brugge (BE)

( * ) Notice: Subject to any disclaimer, the term of this patent is extended or adjusted under 35 U.S.C. 154(b) by 433 days.

(21) Appl. No.: 12/759,793

(22) Filed: Apr. 14, 2010

(65) Prior Publication Data

US 2010/0267518 A1 Oct. 21, 2010

Related U.S. Application Data

(60) Provisional application No. 61/214,115, filed on Apr. 20, 2009.

(51) Int. Cl.
*B60W 10/02* (2006.01)
*F16H 47/00* (2006.01)

(52) U.S. Cl. ............................................ 477/5; 74/730.1
(58) Field of Classification Search .............. 475/5, 302; 477/3, 5; 180/65.22; 74/404, 325, 329, 331, 74/730.1
See application file for complete search history.

(56) References Cited

U.S. PATENT DOCUMENTS

| | | | | |
|---|---|---|---|---|
| 2,309,413 | A * | 1/1943 | Neracher et al. | 123/179.31 |
| 6,184,603 | B1 * | 2/2001 | Hamai et al. | 310/75 R |
| 6,306,057 | B1 * | 10/2001 | Morisawa et al. | 475/5 |
| 6,346,062 | B1 * | 2/2002 | Shimabukuro et al. | 477/5 |
| 7,341,534 | B2 * | 3/2008 | Schmidt | 475/5 |
| 7,669,741 | B2 * | 3/2010 | Ozaki | 223/28 |
| 8,206,252 | B2 * | 6/2012 | Dusenberry et al. | 475/5 |
| 2002/0103055 | A1 * | 8/2002 | Tani et al. | 477/115 |
| 2008/0011529 | A1 * | 1/2008 | Hoher et al. | 180/65.2 |

FOREIGN PATENT DOCUMENTS

| | | |
|---|---|---|
| EP | 0 989 299 A1 | 3/2000 |
| EP | 1 031 487 A2 | 8/2000 |
| EP | 1 205 330 A2 | 5/2002 |
| EP | 1 422 449 A2 | 5/2004 |

* cited by examiner

*Primary Examiner* — Roger Pang
(74) *Attorney, Agent, or Firm* — Marshall & Melhorn LLC

(57) ABSTRACT

A hybrid transmission for a vehicle and its method of use are described. The transmission may have an internal combustion engine and an electric device. A torque converter is connected between the internal combustion engine and a set of direction clutches. The direction clutches are also connected to an intermediate gear set. The electric device is also connected to the intermediate gear set for providing rotational energy to the intermediate gear set or absorbing energy from the intermediate gear set. The electric device is connected to at least one super capacitor.

9 Claims, 1 Drawing Sheet

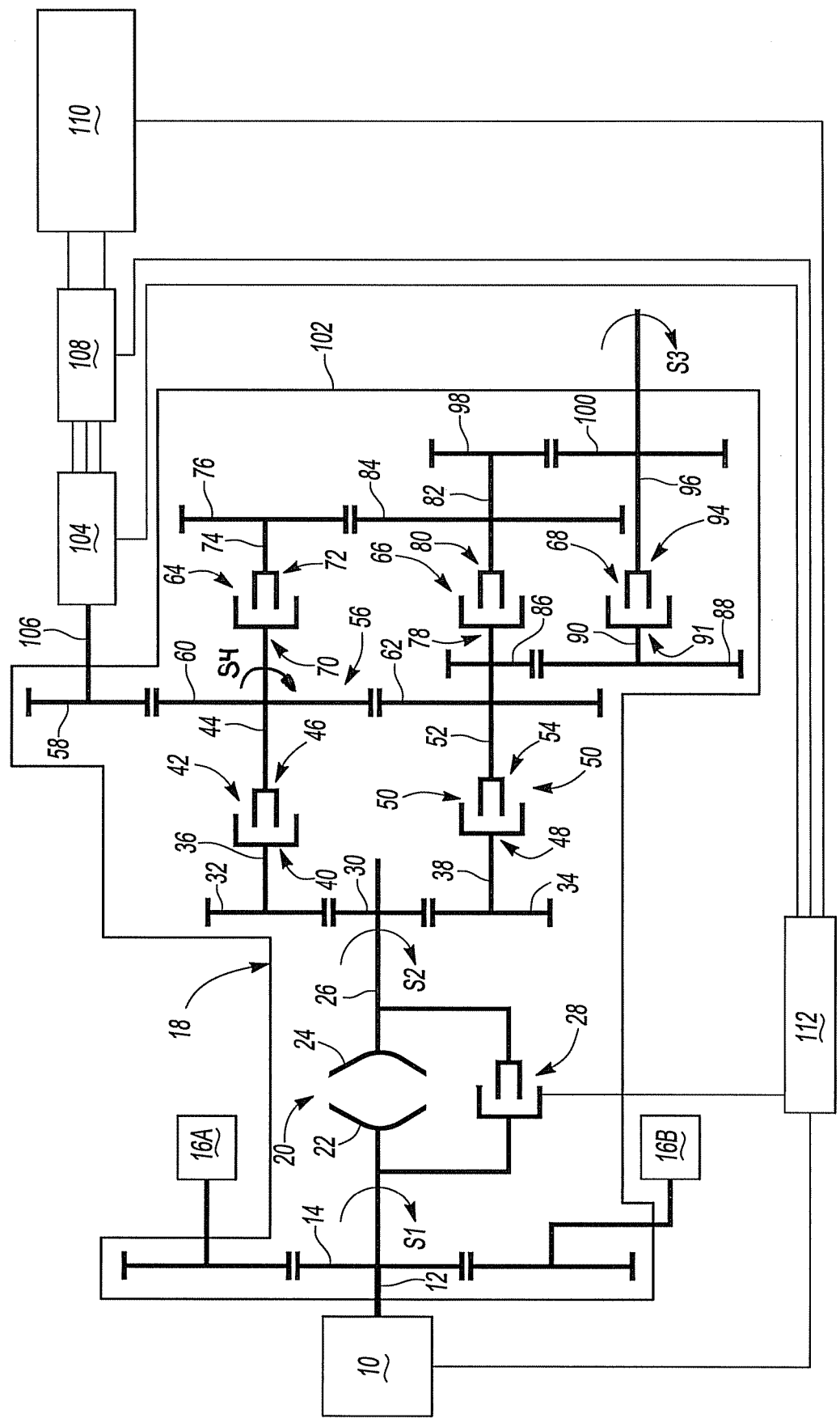

HYBRID TRANSMISSION AND METHOD OF USE

RELATED APPLICATIONS

This application claims benefit from the U.S. provisional patent application filed on Apr. 20, 2009 and assigned Ser. No. 61/214,115, which is incorporated by reference in its entirety herein.

FIELD OF THE INVENTION

The present invention relates to a hybrid transmission where both an electric device and a prime mover are connected to the transmission. The electric device provides energy to, and recovers energy from, the transmission.

BACKGROUND OF THE INVENTION

A product or process designated as a hybrid typically refers to something with two or more unlike features. In the context of vehicles, the term hybrid is typically used to refer to a vehicle that has two or more means or modes for providing movement. For example, one means or mode might comprise an internal combustion engine and the other means or mode might comprise an engine or motor operating from a different power source or utilizing a different fuel. That different power source may be such as electricity.

Off-highway vehicles lend themselves to hybrid technology. These vehicles include, but are not limited to working vehicles such as those used in construction, agriculture, mining, forestry, material handling, specialty chassis, outdoor power equipment, leisure/utility vehicles, and those used in various industrial markets.

As can be appreciated by the foregoing list of vehicles, off-highway vehicles are often required to be robustly constructed vehicles that must be capable of working in nontraditional environments and/or nontraditional conditions. However, prior hybridized off-highway vehicles using a torque converter are known to have specific constraints that can be exacerbated by these environments, conditions and vehicle layout/design.

By way of example, one constraint of torque converters is that they cannot be efficiently driven in the reverse direction. In other words, when power is provided to the torque converter from the turbine side of the converter, the converter does not operate as efficiently as when power is provided from the impeller side. Examples such as these are exacerbated by environments, conditions and vehicle layouts, where room to operate a vehicle can be very tight and/or where there is a danger of explosion.

Known hybridized off-highway vehicles connect an electric device directly to the engine, typically between the engine and the transmission. The drawback with this design is that additional space is needed in the already tight engine compartment for the electric device. Additionally, as the transmission is moved further from the engine to accommodate the electric device, it can interfere with parts of the chassis.

Other solutions connect the electric device to the transmission output. Since the spread on speed is quite large (because of the number of gears), dimensioning an electric device at this location is difficult since it must combine very high torque at very low speeds with high speeds.

The present invention, described more fully below, overcomes the limitations associated with the known hybrid technologies and employs, by way of example only, it in an off-highway vehicle.

SUMMARY OF THE INVENTION

A hybrid transmission for a vehicle and its method of use are described. The transmission may have an internal combustion engine and an electric device. A torque converter is connected between the internal combustion engine and a set of direction clutches. The direction clutches are also connected to an intermediate gear set. The electric device is also connected to the intermediate gear set for providing rotational energy thereto or absorbing energy therefrom. The electric device is connected to at least one super capacitor through an electric drive.

BRIEF DESCRIPTION OF THE DRAWINGS

The above, as well as other advantages of the present invention, will become readily apparent to those skilled in the art from the following detailed description when considered in the light of the accompanying drawing in which:

FIG. 1 is a schematic of the various features of the present invention.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawing, and described in the following specification are simply exemplary embodiments of the inventive concepts defined herein. Specific dimensions, directions or other physical characteristics relating to the embodiments disclosed are not to be considered as limiting, unless expressly stated otherwise.

FIG. 1 depicts an electric parallel hybrid transmission for a vehicle utilizing a dual power path transmission control system. A prime mover, such as an internal combustion engine (ICE) 10, is provided. The ICE 10 may be diesel powered or powered by any other known energy source.

The ICE 10 has an engine output shaft 12 with at least one gear 14 secured thereto. The gear 14 may be connected with a main pump 16A and a charge pump 16B to provide rotational energy for powering the pumps. Gear 14 may be connected to the pumps 16A, 16B through one or more gears, or other connection.

The pumps 16A, 16B may be hydraulic pumps used for running auxiliary equipment on the vehicle. Such equipment may be such as power take-offs, loaders, lifters and the like.

As shown in FIG. 1, a transmission 18, comprising a torque converter 20, is connected to the engine output shaft 12. The torque converter 20 comprises an impeller 22 and a turbine 24. Preferably, the engine output shaft 12 is connected to the impeller 22 and the impeller 22 rotates with the engine 10 providing the impeller 22 with a speed substantially equal to the engine speed, which will be designated as S1. Those skilled in the art know that a fluid connection in the torque converter 20 selectively connects the impeller 22 and the turbine 24 to provide rotational energy through the torque converter 20 to the turbine 24.

The turbine 24 is connected to a turbine shaft 26, also known as a torque converter output shaft. Those skilled in the art know that the turbine 24 may have a speed that is substantially the same as the speed of the impeller 22 or a speed that is different from the speed of the impeller 22 during operation of the transmission 18. The turbine speed is S2.

A clutch 28 is provided in parallel with the torque converter 20. The clutch 28 is a lock-up type clutch that is connected at one end to the engine output shaft 12 and at the other end to the turbine shaft 26. The clutch 28 may be selectively engaged to mechanically join the turbine shaft 26 and the engine output shaft 12.

One or more gears are connected to the turbine shaft 26 for rotation therewith. In the depicted embodiment, one gear 30 is mounted on the shaft 26. Gear 30 is meshed with two other gears 32, 34, although the number of gears connected to gear 30 may vary. The gears 32, 34 may be each connected to at least one directional clutch.

In the present embodiment, each gear 32, 34 is mounted on its own shaft 36, 38, respectively. Shaft 36 is connected to a first side 40 of a clutch 42. Clutch 42 may be a directional clutch, such as a forward clutch. A shaft 44 extends from a second side 46 from the forward clutch 42.

Shaft 38 is connected to a first side 48 of a clutch 50. Clutch 50 may be a direction clutch such as a reverse clutch. A shaft 52 extends from a second side 54 from the reverse clutch 50.

Preferably, each directional clutch 42, 50 is connected to an intermediate gear set 56. The intermediate gear set 56 is comprised of a plurality of connected gears 58, 60, 62, 86, 88 and their shafts. Gears 60 and 62 are mounted on, or connected to, shafts 44 and 52, respectively, for rotation therewith. Gear 86 is mounted on shaft 52. Gear 88 is mounted on shaft 90.

There are typically one or more other gear sets in the transmission (not shown). These gear sets, as well as the intermediate gear set 56, are designed so that speed S1 of the ICE 10 is matched with an output speed S3 of the transmission 18. Speed S1 is matched with speed S3 by using at least one of the direction clutches 42, 50 and a range clutch, which is discussed below. The output and its speed are described below. In this manner of using gear sets, as well as the clutches described herein, the speed range of the ICE 10 can be increased to provide the vehicle with a larger speed range.

In a similar manner, the intermediate gear set 56 in the present invention is designed to match the output speed S3 of the transmission 18 with an electric device, described below. The different elements of the intermediate gear set 56 have different speeds according to the present gear ratios. While this speed varies due to the engaged clutches, it will generally be designated S4 to distinguish it from speeds S1, S2 and S3. FIG. 1 depicts S4 on one shaft, in this case on shaft 44, although as mentioned, S4 depends on the clutches engaged and engaged gear ratios. Speeds S1-S4 are linked when one of the clutches 42, 50 and one of the range clutches described below, are closed.

Range clutches, designated as 64, 66, 68 in FIG. 1, are connected on one side to the intermediate gear set 56. Range clutch 64 is connected to the intermediate gear set 56 by shaft 44. More particularly, an input side 70 of clutch 64 is connected to the shaft 44. An output side 72 of clutch 64 is connected to a shaft 74. Gear 76 is located on shaft 74.

Range clutch 66 is connected to the intermediate gear set 56 by shaft 52. An input side 78 of clutch 66 is connected to shaft 52. An output side 80 of clutch 66 is connected to a shaft 82. Gear 84 is located on shaft 82.

A gear 86 is provided on shaft 52. The gear 86 is meshed with another gear 88. Gear 88 is mounted on shaft 90. Shaft 90 turns an input side 91 of range clutch 68. An output side 94 of clutch 68 is connected to an output shaft 96 of the transmission 18.

Yet another gear 98 is mounted for rotation on shaft 82. Gear 98 is meshed with another gear 100 mounted on the output shaft 96. In this manner, range clutches 64 and 66 are connected to the transmission output 96. The connection of the range clutch 68 to the output 96 is described above.

In the depicted example, three range clutches 64, 66, 68 are provided, however, it is within the scope of the present invention to provide additional or fewer range clutches. Further, the transmission 18 described herein is readily adaptable to long and short drop configurations.

The transmission output shaft 96 may be connected to any axle system (not shown) for providing rotational movement to one or more wheels of the vehicle. For any or all of the gearing described and depicted herein, high contact ratio spur gears may be used in conjunction with helical gears to reduce noise.

The foregoing is enclosed within a transmission housing 102. The housing 102 may be connected to the ICE 10 and/or the vehicle chassis (not shown). The housing 102 is typically provided with lubricant to maintain lubricity among the various moving parts, to keep them clean and to reduce heat.

An electric device 104 is connected to the intermediate gear set 56, such as by a shaft 106 connected to gear 58. Gear 58 and shaft 106 are part of the intermediate gear set 56. The electric device 104 is capable of functioning as both a motor and a generator. Thus, electrical energy can be provided to the device 104 so that it functions as a motor capable of selectively turning shaft 106 and gear 58 to provide rotational energy to the intermediate gear set 56. Electric device 104, by virtue of the same connection to the intermediate gear set 56, can be turned by the intermediate gear set 56 so that it functions to generate electricity. In either of these operating conditions, it can be appreciated that the speed of the electric device 104 is the speed of the gear 58.

The intermediate gear set 56 can be sized to make the electric device 104 more compact by up-speeding the intermediate speed. The gear size selection may also result in an increase in the power density of the electric device 104. Further, the large speed range at the transmission output 96 is reduced by means of the range clutches 64, 66, 68 to a smaller range.

Shaft 106 can be integrated into the transmission housing 102 for support and to use the same lubrication as in the housing 102. Shaft 106 can extend through a rear portion of the housing 102 so that the electric device 104 can be located at the back of the transmission 18 above the output shaft 96, where space is available.

Locating the electrical device 104 and its associated componetry at the back of the transmission 18 does not require the location of the transmission 18 to change when the electric device 104 is added to a transmission 18 already installed in the vehicle. This makes it easier to retroactively install the electric device 104 and its components as a bolt-on system without needing to change the layout of the vehicle or moving the transmission 18 to another location.

As shown in FIG. 1, the electric device 104 is connected to an electric drive 108. The electric drive 108 converts 3 phase current to direct current, and also vice versa. The electric drive 108 is also connected to a bank of super capacitors 110. A plurality of individual super capacitors 110 can be connected to one another to form the bank 110. A controller 112 is connected also to the electric drive 108 to control the electric drive 108, monitor its operation, and/or to receive electric power therefrom.

The controller 112 is also connected to the transmission 18. More particularly, the controller 112 is connected to the ICE 10, a hydraulic valve (not shown) which controls at least clutch 28 (and may control all the transmission clutches), the electric device 104, the electric drive 108 and the capacitors 110.

The controller 112 continuously monitors the operating conditions, such as speeds S1-S4, fluid pressures and temperatures of the transmission 18 and selects the proper combination of traditional power, such as that provided by diesel fuel via the combustion engine 10, and electric power from the electric device 108 to optimize productivity while reducing fuel consumption, emissions, noise and engine idling. The controller 112 may also have additional safety inhibits, diagnostics, system monitoring, and vehicle position control. Those skilled in the art will appreciate that these features improve ease of use, safer and faster vehicle operation, especially in confined areas where large loads need to be maneuvered carefully. For example, rotational energy may be provided to the intermediate gear set 56 via the electric device 104 at vehicle start-up, for acceleration and for load hoisting, thus saving the fuel for the ICE 10 that would have been used for these functions.

In load hoisting, the vehicle is lifting or moving a load, and thus may require additional power for the task. Here, the lock-up clutch 28 is closed and the torque converter 20 is by-passed to increase efficiency at this connection. Additional power is delivered to the transmission 18 by engaging the electric device 104 in support of the ICE 10. One direction clutch 42 or 50 is typically closed and the range clutches 64, 66, 68 are opened. The range clutches 64, 66, 68 can be closed at any time, however, to permit vehicle inching.

Additionally, the controller 112 can cause power from the supercapacitors 110 to be supplied to the transmission 18, via the electric drive 108 and the electric device 104 and their connection to the intermediate gear set 56. This power has been stored in the super capacitors 110 for any low energy consumption operation such for as inching movements, for the vehicle lights, for the climate control system and for other electrical accessories. The controller 112 can be programmed to control, such as by idling, the ICE 10 and cause the transmission 18 run on power from the super capacitors 110 whenever possible.

Based on the foregoing, it can be appreciated that the electric device 104 can provide the transmission 18 with additional tractive effort under many conditions. Further examples of this include, but are not limited to, added torque as well as faster take off times for the vehicle.

For light loads encountered by the vehicle, the ICE 10 may work alone in an optimal speed-torque range, while the electric device 104 and the electric drive 108 substantially simultaneously serve as a generator to charge the super capacitors 110 for later use.

Energy recovered from vehicle braking may also be utilized as a source of regenerative energy for recharging the super capacitors 110. This may be, by way of example only, accomplished by opening the connection between the direction clutches 42, 50 which connect the turbine speed S2 and the intermediate gear set speed S4 during braking. Regardless, the electric device 104 is connected to the wheels. It can absorb their energy and function as a generator. Additional braking force may be applied by mechanical brakes (not shown) which are available on the vehicle.

Similarly, energy may also be recovered from the transmission 18 via the intermediate gear set 56 and electric device 104 during shuttling operations of the vehicle. A shuttling operation typically comprises a braking phase and an acceleration phase and it permits the vehicle to change directions without stopping. The present system permits the electric device 104, electric drive 108 and super capacitors 110 to absorb the energy in the transmission 18 during shuttling operations by means of the intermediate gear set 56. This energy would have been otherwise dissipated in the torque converter 20 and slipped clutches. The absorbed energy can be used for recharging the super capacitors 110 where it is subsequently relatively immediately released during the acceleration phase.

Additional energy may also be recovered from the transmission 18 when a load that the vehicle is carrying is lowered from a first position to a second lower position. Under these circumstances, as the load is lowered, fluid is pushed through the main pump 16A causing it to rotate. The rotating main pump 16A rotates the shaft 26 by means of the lock-up clutch 28, which is closed. The lock-up clutch 28 is connected to one of the direction clutches 42, 50, which is closed. The closed direction clutch 42, 50 rotates the intermediate gear set 56, to which the electric device 104 is connected, thus permitting the electric device 104 to function as a generator. In this mode, the range clutches 64, 66, 68 are opened. However, they can be promptly closed to permit inching.

It can be appreciated that the ICE 10, being so supplemented, can be reduced in size compared to an ICE 10 that would be required without such supplementation. The reduced size of the ICE 10 results in reduced fuel consumption and lower emissions without an overall reduction in available torque.

The super capacitors 110 comprise a bank of available energy for the vehicle. The super capacitors 110 are advantageous over traditional batteries because, unlike traditional batteries, they are capable of many charging and recharging duty cycles, they are very robust systems with low internal resistance, and they can store and release energy very quickly. Super capacitors 110 also have the advantage over batteries in that they do not have the same chemical safety issues to deal with and they are, for their power density, less expensive than batteries.

As stated above, the present invention provides for an inching option. During inching, one or more clutches in the transmission need to slip to slowly move the vehicle while the ICE 10 is running at high speed to provide enough power to the hydraulic pump 16A because the vehicle is likely handling a load. Thus, the hydraulic pump 16A has a high power demand while the transmission output 96 has a low power demand.

In traditional systems, as one of the range clutches 64, 66, 68 slips it causes the transmission 18 to wear, which shortens the lifetime of the transmission 18. In the present invention, however, the combustion engine 10 can run at full or high speed, which permits the pump 16A to run at full speed. At the same time, the direction clutches 42, 50 can be opened between turbine speed S2 and intermediate gear set speed S4 to disconnect the transmission output 96 from the ICE 10. The driving torque will be provided through the gear 58, which is turned by the electric device 104 which is turned by the electrical energy from the capacitors 110. Based on the foregoing, it can be appreciated that the life of the transmission 18 can therefore be increased.

It is also permissible for driving torque to be provided through gear 58, by electric device 104, when a direction clutch 42 or 50 and a range clutch 64, 66 or 68 are closed. In this condition, the transmission 18 is provided with additional tractive effort by the electric device 104.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A hybrid transmission for a vehicle, comprising:
   a driveshaft rotationally connected to an internal combustion engine, wherein at least one pump is connected to said driveshaft;
   a torque converter comprising an impeller and a turbine, wherein said impeller is connected for rotation with said driveshaft and said turbine is connected to a torque converter output shaft;
   a forward direction clutch and a reverse direction clutch connected to said torque converter output shaft, wherein both of said clutches selectively directly drive an intermediate gear set;
   at least two range clutches selectively directly driven by said intermediate gear set, said range clutches connected to a transmission output shaft; and
   an electric device positioned, in order, after said torque converter and after said forward direction clutch and said reverse direction clutch and before said range clutches for direct driving connection to said intermediate gear set, said electric device connected to at least one super capacitor.

2. The transmission of claim 1, wherein said intermediate gear set comprises a gear and an associated shaft for each range clutch and an input gear connected to a shaft of said electric device.

3. The transmission of claim 1, wherein said range clutches are each provided with range clutch output shafts, said range clutch output shafts carry gears connected to one another and a transmission output shaft.

4. The transmission of claim 1, wherein said torque converter output shaft and said range clutches are selectively connected by a gear on said torque converter output shaft and either a forward direction clutch or a reverse direction clutch.

5. The transmission of claim 1, wherein said direction clutches have output shafts, said direction clutch output shafts each carry thereon for rotation therewith a gear from said intermediate gear set.

6. The transmission of claim 5, wherein said direction clutch output shafts are connected to at least two of said range clutches.

7. The transmission of claim 1, wherein a lock-up clutch is connected to said driveshaft and said torque converter output shaft.

8. A hybrid transmission for a vehicle, comprising:
   a driveshaft rotationally connected to an internal combustion engine, wherein at least one pump is connected to said driveshaft;
   a torque converter comprising an impeller and a turbine, wherein said impeller is connected for rotation with said driveshaft and said turbine is connected to a torque converter output shaft;
   a forward direction clutch and a reverse direction clutch connected to said torque converter output shaft, wherein both of said clutches selectively directly drive an intermediate gear set;
   at least two range clutches selectively directly driven by said intermediate gear set, said range clutches connected to a transmission output shaft; and
   an electric device positioned, in order, after said torque converter and after said forward direction clutch and said reverse direction clutch and before said range clutches for direct driving connection to said intermediate gear set, said electric device connected to at least one super capacitor; and
   wherein said direction clutches have output shafts, said direction clutch output shafts each carry thereon for rotation therewith a gear from said intermediate gear set.

9. The transmission of claim 8, wherein said direction clutch output shafts are connected to at least two of said range clutches.

* * * * *